June 10, 1947. W. K. HOLLERON 2,421,883
DITCHING MACHINE
Filed March 26, 1945
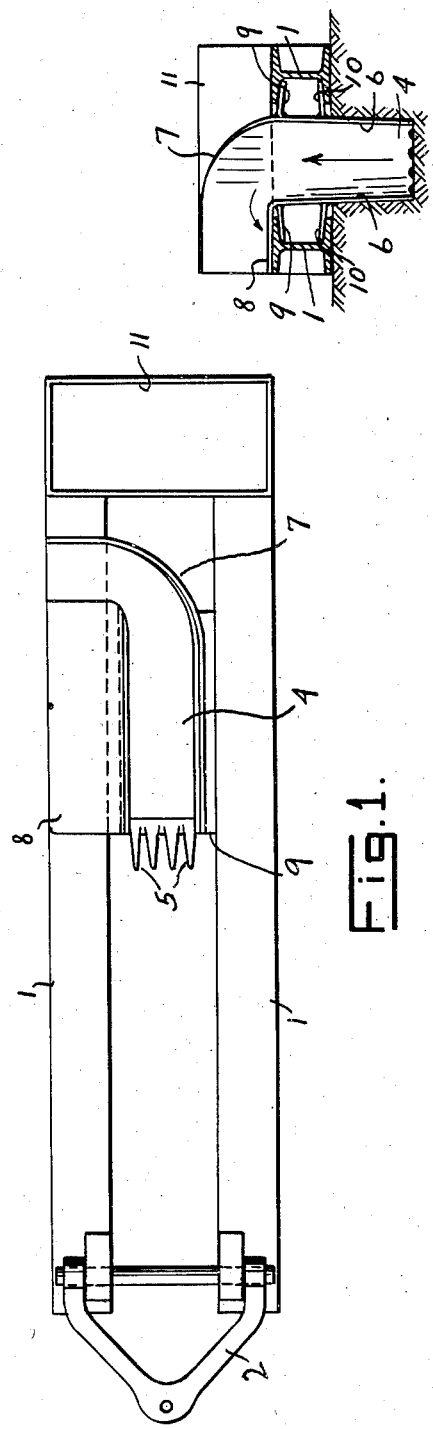
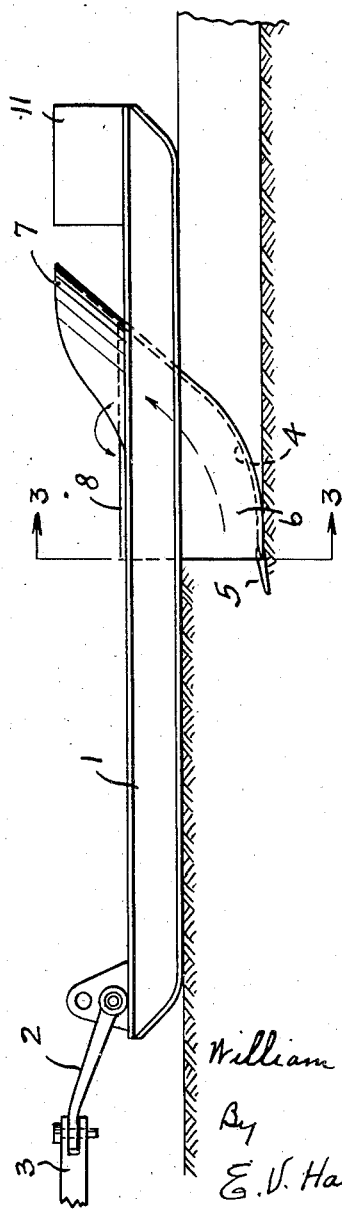
Inventor
William K. Holleron
By
E. V. Hardway.
Attorney Patented June 10, 1947

2,421,883

UNITED STATES PATENT OFFICE 2,421,883

DITCHING MACHINE

William K. Holleron, Victoria, Tex.

Application March 26, 1945, Serial No. 584,938

1 Claim. (Cl. 37—98)

This invention relates to a ditching machine.

An object of the invention is to provide a plow of the character described specially designed for the purpose of forming and completing a ditch as the plow is moved along the surface of the ground.

Another object of the invention is to provide a ditching plow comprising spaced skids with a plow share between the skids which inclines rearwardly and upwardly with approximately vertical moldboards on opposite sides of the share thus forming an elevating chute with a laterally turned deflector at the upper end of the share for deflecting the earth, elevated by the share, and depositing it along side the ditch being formed.

A further object of the invention is to provide a ditching plow of the character described having a side platform to receive the earth from the deflector and to distribute it along side the ditch as the plow moves along.

With the above and other objects in view the invention has particular relation to certain novel features of construction, arrangement of parts and use, an example of which is given in this specification and illustrated in the accompanying drawings, wherein:

Figure 1 shows a plan view of the plow.

Figure 2 shows a side view; and

Figure 3 shows a cross, sectional view taken on the line 3—3 of Figure 2.

Referring now more particularly to the drawings, wherein like numerals of reference designate the same parts in each of the figures, the numerals 1, 1 designate the runners of the skid. As shown, these runners are formed of I-beams with their ends turned upwardly as seen in Figure 2.

Fastened to the front end of the skid there is a tow bar 2 whereby the plow may be attached to a tractor hitch 3. This connection may be adjusted vertically, as shown in Figure 2, to regulate the depth of the share.

Between the runners 1, 1 there is a share 4. It is rearwardly and upwardly inclined and its forward edge may be formed with spaced, sharp, forwardly directed prongs 5 which penetrate into the earth. The rear upper end of the share terminates at the approximate level of the skid.

On opposite sides of the share and welded or otherwise secured thereto are the vertical moldboards 6, 6 which extend upwardly to the top of the skid thus forming, in effect, a chute through which the earth from the ditch is elevated. Continuing from the top of one of the moldboards and curved around to the opposite side of the plow there is a deflector 7 which directs the loose earth laterally.

In front of the discharge end of the deflector and extending forwardly to approximately the forward end of the share there is a platform 8 arranged horizontally and located on top of the corresponding runner. This platform, or apron, catches the loose earth and prevents it from falling back into the ditch but, on the other hand, discharges it off of the outside of the platform onto the ground along side the ditch.

The moldboards 6 have the external upper and lower flanges 9 and 10 welded thereto and also welded to the corresponding upper and lower flanges of the runners whereby the moldboards and share are effectively secured to the skid. These flanges 9 and 10 are of substantially the same length as the moldboards, as shown in Figure 1.

If desired the rear end of the skid may be equipped with a box 11 for containing a weight if it be found necessary to add additional weight to the plow to cause the plow to run at the required depth.

The drawings and description are illustrative merely while the broad principle of the invention will be defined by the appended claim.

What I claim is:

A ditching plow comprising a skid having spaced runners secured in fixed relation to each other and provided with inwardly extended flanges, a forwardly declining curved share between the runners, an approximately vertical plate on each side of the share having external upper and lower flanges secured to the adjacent runner flanges, said vertical plates being also secured to the share on each side thereof, said share and mold boards forming a chute for forming a ditch and elevating the earth therefrom as the plow moves forwardly, the upper end of the chute being at approximately the level of the runners, a vertical side deflector extending longitudinally of, and upwardly from, one of the vertical plates and whose rear end is curved laterally around the upper end of the chute to the opposite side of the skid, to discharge the raised earth laterally in one direction only and a side platform on the opposite side of the chute from the vertical deflector and extending, horizontally, along one side of the chute, in transverse alignment with, and of substantially the same length as, the vertical plates and arranged to receive the elevated earth and conduct the same laterally beyond the skid.

WILLIAM K. HOLLERON.

REFERENCES CITED

The following references are of record in the file of this patent:

UNITED STATES PATENTS

| Number | Name | Date |
|---|---|---|
| 2,440 | Aiken | Feb. 1, 1842 |
| 63,952 | Smawley | Apr. 16, 1867 |
| 94,539 | Anderson et al. | Sept. 7, 1869 |
| 311,668 | Murray et al. | Feb. 3, 1885 |